(12) United States Patent
Asok Kumar et al.

(10) Patent No.: US 12,332,369 B2
(45) Date of Patent: Jun. 17, 2025

(54) RADIO FREQUENCY SENSING USING A SINGLE DEVICE BASED ON CONCURRENT TRANSMIT AND RECEIVE

(71) Applicant: QUALCOMM Incorporated, San Diego, CA (US)

(72) Inventors: Jayanand Asok Kumar, Fremont, CA (US); Manyuan Shen, San Jose, CA (US); Xiaoxin Zhang, Sunnyvale, CA (US); Kapil Rai, Sunnyvale, CA (US); Vikram Kandukuri, Bangalore (IN); James Gardner, San Ramon, CA (US); Vincent Knowles Jones, IV, Redwood City, CA (US); Didier Johannes Richard Van Nee, Tull en 't Waal (NL); Prasanna K. Basaralu Subramanya, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/242,589

(22) Filed: Apr. 28, 2021

(65) Prior Publication Data

US 2022/0349980 A1 Nov. 3, 2022

(51) Int. Cl.
*G01S 5/02* (2010.01)
*H04B 17/27* (2015.01)
(Continued)

(52) U.S. Cl.
CPC ............ *G01S 5/0205* (2013.01); *H04B 17/27* (2015.01); *H04J 11/00* (2013.01); *H04J 13/0062* (2013.01)

(58) Field of Classification Search
CPC ........ G01S 5/0205; H04B 17/27; H04J 11/00; H04J 13/0062
See application file for complete search history.

(56) References Cited

U.S. PATENT DOCUMENTS 10,742,254 B1 * 8/2020 Lynam ................ H03M 1/1033
11,841,455 B1 * 12/2023 Arool Emmanuel ........................
G01S 7/4013
(Continued)

OTHER PUBLICATIONS

Daniels R.C., et al., "Forward Collision Vehicular Radar With IEEE 802.11: Feasibility Demonstration Through Measurements", IEEE Transactions on Vehicular Technology, IEEE, USA, vol. 67, No. 2, Feb. 1, 2018, pp. 1404-1416, XP011677702, ISSN: 0018-9545, DOI: 10.1109/TVT.2017.2758581 [retrieved on Feb. 16, 2018] figure 1, p. 1405-p. 1406.
(Continued)

*Primary Examiner* — Sam K Ahn
*Assistant Examiner* — Amneet Singh
(74) *Attorney, Agent, or Firm* — SUNSTEIN LLP

(57) ABSTRACT

Techniques are provided for radio frequency (RF) sensing using a single wireless device. An example method for determining a distance to an object with radio frequency sensing includes transmitting a radio frequency signal with a transmit channel on a wireless device, receiving a leakage signal with a receive channel on the wireless device at a first time, such that the leakage signal is based on the radio frequency signal, receiving a reflected signal with the receive channel on the wireless device at a second time, such that the reflected signal is based on the radio frequency signal reflecting from the object, and determining the distance to the object based at least in part on a difference between the first time and the second time.

39 Claims, 10 Drawing Sheets

(51) Int. Cl.
 *H04J 11/00* (2006.01)
 *H04J 13/00* (2011.01)

(56) References Cited

U.S. PATENT DOCUMENTS

| | | | |
|---|---|---|---|
| 2009/0135672 A1* | 5/2009 | Matsuura | G01S 15/42 367/100 |
| 2014/0168002 A1* | 6/2014 | Sakamoto | G01S 7/34 342/92 |
| 2018/0020423 A1* | 1/2018 | Wang | H04L 5/0048 |
| 2018/0262866 A1* | 9/2018 | Haverinen | H04B 17/20 |
| 2018/0309474 A1* | 10/2018 | Cheung | G01S 7/52 |
| 2019/0383925 A1 | 12/2019 | Gulati et al. | |
| 2020/0112939 A1 | 4/2020 | Scharf et al. | |
| 2020/0249339 A1* | 8/2020 | Li | G01S 13/325 |
| 2020/0400779 A1 | 12/2020 | Qiu et al. | |

OTHER PUBLICATIONS

International Search Report and Written Opinion—PCT/US2022/022572—ISA/EPO—Jul. 15, 2022.

\* cited by examiner

RADIO FREQUENCY SENSING USING A SINGLE DEVICE BASED ON CONCURRENT TRANSMIT AND RECEIVE

BACKGROUND

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with the AP in a Wi-Fi network may be referred to as wireless stations (STAs).

Some wireless devices may be configured to communicate with other wireless devices using radio-frequency signals. For example, a network may include several Internet of Things (IoT) objects and devices configured to wirelessly communicate with each other. Many IoT devices such as smart appliances, smart televisions, and smart thermostats may be configured support wireless protocols such as Wi-Fi and/or Bluetooth. The wireless channels between the wireless devices, and APs, may be used for radio frequency (RF) sensing applications. The devices may listen to and capture the channel parameters on the transmissions between the devices. An object may be detected based on the change to the channel state between the wireless devices.

SUMMARY

An example method for determining a distance to an object with radio frequency sensing according to the disclosure includes transmitting a radio frequency signal with a transmit channel on a wireless device, receiving a leakage signal with a receive channel on the wireless device at a first time, such that the leakage signal is based on the radio frequency signal, receiving a reflected signal with the receive channel on the wireless device at a second time, such that the reflected signal is based on the radio frequency signal reflecting from the object, and determining the distance to the object based at least in part on a difference between the first time and the second time.

Implementations of such a method may include one or more of the following features. The radio frequency signal may be a predesignated sequence. The predesignated sequence may be a single carrier Zadoff-Chu sequence. The predesignated sequence may include orthogonal frequency-division multiplexed symbols. The predesignated sequence may include one or more Wi-Fi packets. A plurality of radio frequency signals may be transmitted and receiving one or more of the plurality of radio frequency signals. The method may include transmitting a plurality of radio frequency signals with a plurality of transmit channels. Receiving the radio frequency signal may include receiving the radio frequency signal with a plurality of receive chains Angle of arrival and angle of departure for received and transmitted radio frequency signals may be determined. Transmitting the radio frequency signal and receiving the radio frequency signal may be performed with a single-chain transmit and receive operation.

An example apparatus according to the disclosure includes a memory, at least one transceiver including at least one transmit chain and at least one receive chain, at least one processor communicatively coupled to the memory and the at least one transceiver, and configured to transmit a radio frequency signal with the at least one transmit chain, receive a leakage signal with the at least one receive chain at a first time, such that the leakage signal is based on the radio frequency signal, receive a reflected signal with the at least one receive chain at a second time, such that the reflected signal is based on the radio frequency signal reflecting from an object, and determine a distance to the object based at least in part on a difference between the first time and the second time.

Implementations of such an apparatus may include one or more of the following features. The radio frequency signal may be a predesignated sequence. The predesignated sequence may be a single carrier Zadoff-Chu sequence, may include orthogonal frequency-division multiplexed symbols, and/or may include one or more Wi-Fi packets. The at least one processor may be further configured to transmit a plurality of radio frequency signals and receive one or more of the plurality of radio frequency signals. The at least one processor may be further configured to transmit a plurality of radio frequency signals with a plurality of transmit chains. The at least one processor may be further configured to receive the radio frequency signal with a plurality of receive chains. The at least one processor may be further configured to determine an angle of arrival for a received radio frequency signal. The at least one processor may be further configured to determine an angle of departure for the radio frequency signal. The at least one processor may be configure to transmit the radio frequency signal and receive the radio frequency signal with a single-chain transmit and receive operation.

An example apparatus for determining a distance to an object with radio frequency sensing according to the disclosure includes means for transmitting a radio frequency signal with a transmit channel on a wireless device, means for receiving a leakage signal with a receive channel on the wireless device at a first time, such that the leakage signal is based on the radio frequency signal, means for receiving a reflected signal with the receive channel on the wireless device at a second time, such that the reflected signal is based on the radio frequency signal reflecting from the object, and means for determining the distance to the object based at least in part on a difference between the first time and the second time.

A non-transitory processor-readable storage medium comprising processor-readable instructions to cause one or more processors to determine a distance to an object with radio frequency sensing according to the disclosure includes code for transmitting a radio frequency signal with a transmit channel on a wireless device, code for receiving a leakage signal with a receive channel on the wireless device at a first time, such that the leakage signal is based on the radio frequency signal, code for receiving a reflected signal with the receive channel on the wireless device at a second time, such that the reflected signal is based on the radio frequency signal reflecting from the object, and code for determining the distance to the object based at least in part on a difference between the first time and the second time.

An example method for determining a distance to an object with radio frequency sensing according to the disclosure includes setting a receive gain on a wireless device to a first level, transmitting a radio frequency signal at a first time with the wireless device, such that a leakage signal is received by the wireless device with the receive gain at the first level, setting the receive gain on the wireless device to a second level, receiving a reflection the radio frequency signal at a second time with the wireless device, such that the receive gain is at the second level, and determining the distance to the object based at least in part on a difference between the first time and the second time.

An example apparatus according to the disclosure includes a memory, at least one transceiver, at least one processor communicatively coupled to the memory and the at least one transceiver, and configured to set a receive gain on a wireless device to a first level, transmit a radio frequency signal at a first time with the wireless device, such that a leakage signal is received by the wireless device with the receive gain at the first level, set the receive gain on the wireless device to a second level, receive a reflection of the radio frequency signal at a second time with the wireless device, such that the receive gain is at the second level, and determine a distance to an object based at least in part on a difference between the first time and the second time.

An example method of setting a transmission gain for radio frequency sensing according to the disclosure includes setting a first transmission gain to avoid receiver saturation, transmitting a first signal using the first transmission gain, receiving a reflection of the first signal and estimating a transmission gain adjustment value, transmitting a second signal using the transmission gain adjustment value, and receiving a reflection of the second signal and estimating the transmission gain adjustment value.

An example method for controlling a receiver in a wireless device for radio frequency sensing according to the disclosure includes setting a receive gain on a wireless device to a first level, transmitting a radio frequency signal at a first time with the wireless device, wherein a leakage signal is received by the wireless device with the receive gain at the first level, setting the receive gain on the wireless device to a second level, receiving a reflection of the radio frequency signal at a second time with the wireless device, wherein the receive gain is at the second level, and determining a distance to an object based at least in part on a difference between the first time and the second time.

Items and/or techniques described herein may provide one or more of the following capabilities, as well as other capabilities not mentioned. A wireless device is configured to transmit an radio frequency (RF) sensing signal. The gain of one or more receive chains in the wireless device may be increased after the RF sensing signal is transmitted. The RF sensing signal may be reflected by an object and detected by the receive chains. The distance and bearing to the object may be determined. A single wireless device may be used for indoor mapping. The RF sensing signal may be a WiFi signal. The bandwidth of the RF sensing signal may be varied. User gestures may be detected. Other capabilities may be provided and not every implementation according to the disclosure must provide any, let alone all, of the capabilities discussed.

DETAILED DESCRIPTION

Techniques are discussed herein for RF sensing using a single wireless device. Channel capture techniques and RF sensing have become important features in many wireless networks. For example, several IEEE 802.11ac and 802.11ax compatible Wi-Fi Access Points support channel capture based RF sensing, which may have enabled RF sensing applications. These prior solutions, however, have limitations and are not suitable for many applications. In general, the prior channel capture techniques require a second wireless device within reach to transmit wireless signals (e.g., Wi-Fi packets) so that a first wireless device may listen to the signals and capture channel. The requirement for two wireless devices eliminates the use of RF sensing in scenarios where there is only a single wireless device, or there is no wireless traffic to listen in and capture channel (e.g., inside a vehicle, or at night when device communication traffic is low). Additionally, the second wireless device may have certain transmit behavior that causes changes in channel capture even when there is no motion, such as transmit chain switching, random phase between transmit chains, etc., which may degrade RF sensing performance. Using two devices also presents challenges in determining the exact location of motion (i.e., determining if the motion near the first device or the second device).

The techniques provided herein provide RF sensing system using only a single wireless device. The single wireless system may be configured to utilize concurrent transmissions and reception to determine channel capture without the need of another wireless device or additional wireless traffic. The techniques reduce or eliminate the interoperability issue faced by the previous two device current channel capture method since it uses a single wireless device. Further, the use of the single wireless system removes the ambiguity in identifying the location. The single wireless devices described herein may be used for mapping applications, sensing the presence of a user, detecting user gestures, and other RF sensing applications. These techniques and configurations are examples, and other techniques and configurations may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
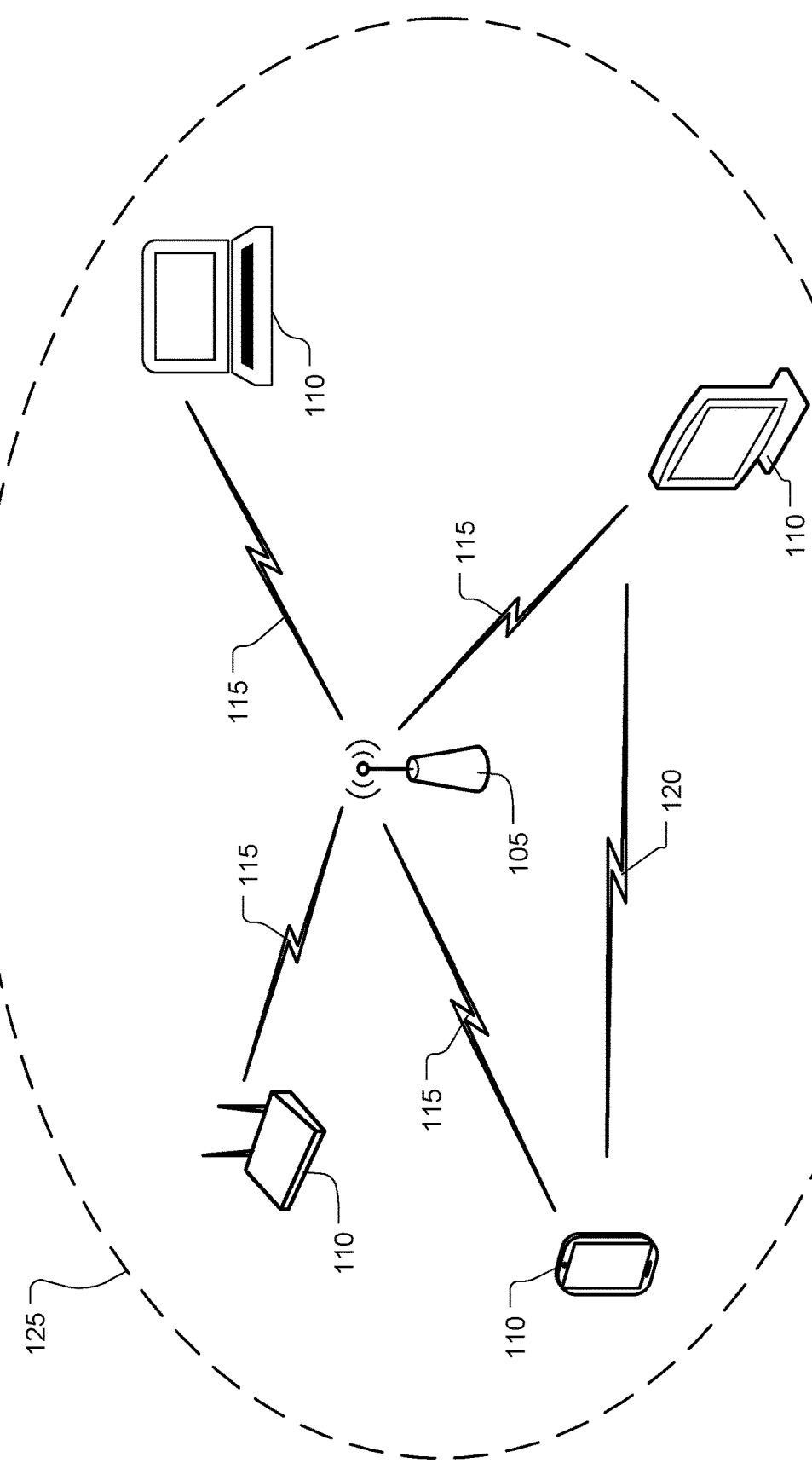
FIG. 1 is a block diagram of an example wide local area network (WLAN).

Referring first to FIG. 1, a block diagram illustrates an example of a WLAN network 100 such as, e.g., a network implementing at least one of the IEEE 802.11 family of standards. The WLAN network 100 may include an access point (AP) 105 and one or more wireless devices 110 or stations (STAs), such as mobile stations, personal digital assistants (PDAs), other handheld devices, netbooks, notebook computers, tablet computers, laptops, display devices (e.g., TVs, computer monitors, etc.), printers, IoT devices, etc. While only one AP 105 is illustrated, the WLAN network 100 may have multiple APs 105. Each of the wireless devices 110, which may also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile. The principles of the present disclosure are described in the context of wireless systems for the purpose of illustration. Nevertheless, it will be understood that these principles are not necessarily limited to wireless systems, and can also be implemented in devices and systems configured to communicate over wired connections.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up only a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, 5G-NR sidelink, PCS, and other P2P group connections. The wireless devices 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, 802.11ax and the like. In other implementations, other peer-to-peer connections and/or ad hoc networks may be implemented within WLAN network 100.

Figure 2:
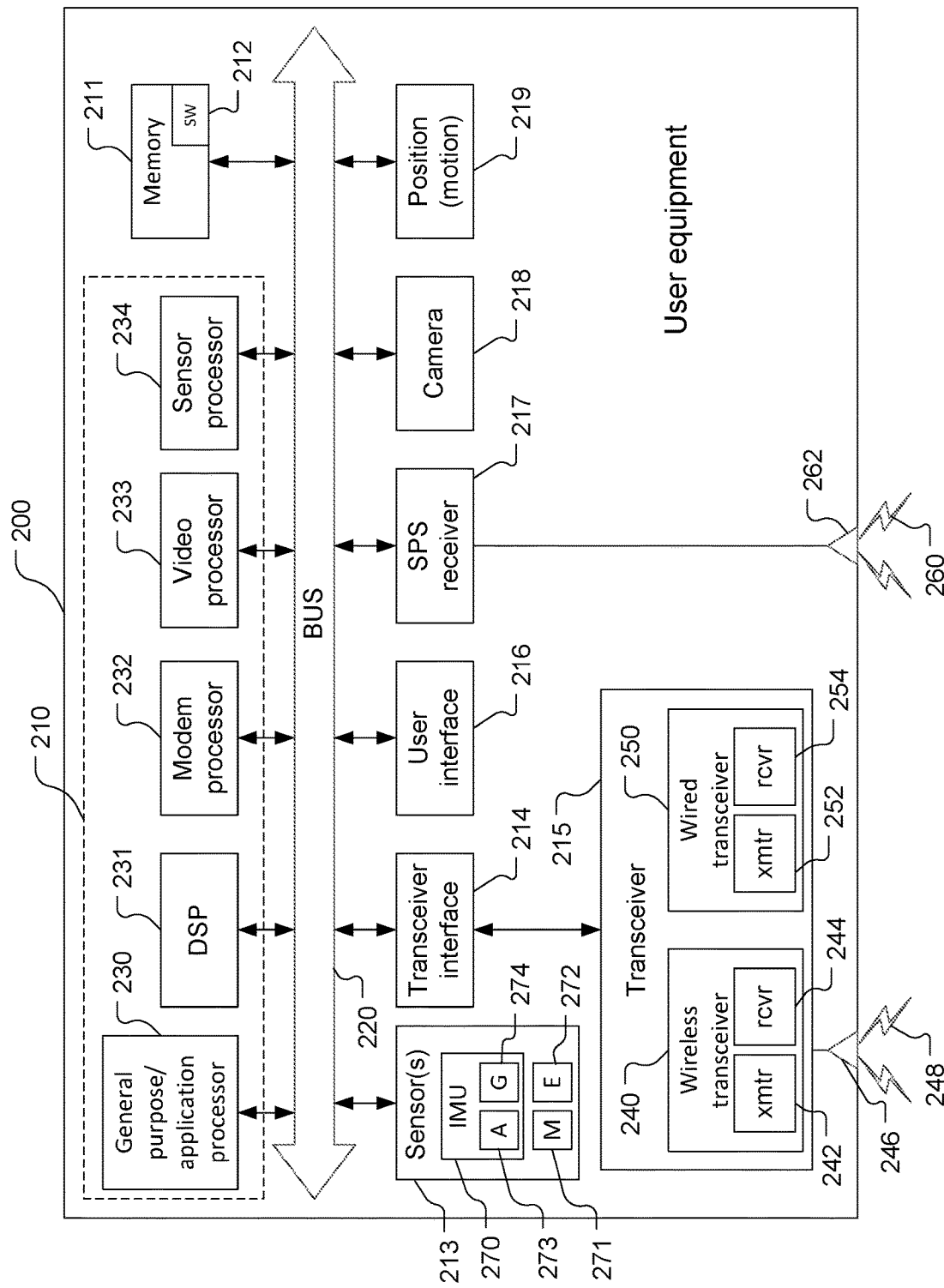
FIG. 2 is a block diagram of components of an example wireless device.

Referring also to FIG. 2, a UE 200 is an example of the wireless devices 110 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing and ultrasound. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250. Other configurations may not include all of the components of the UE 200. For example, an IoT device may include one or more wireless transceivers 240, the memory 211 and a processor 230.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting and/or receiving wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with access points and/or one or more other devices) according to a variety of radio access technologies (RATs) such as IEEE 802.11 (including IEEE 802.11ax), WiFi, WiFi Direct (WiFi-D), Bluetooth®, Zigbee etc. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
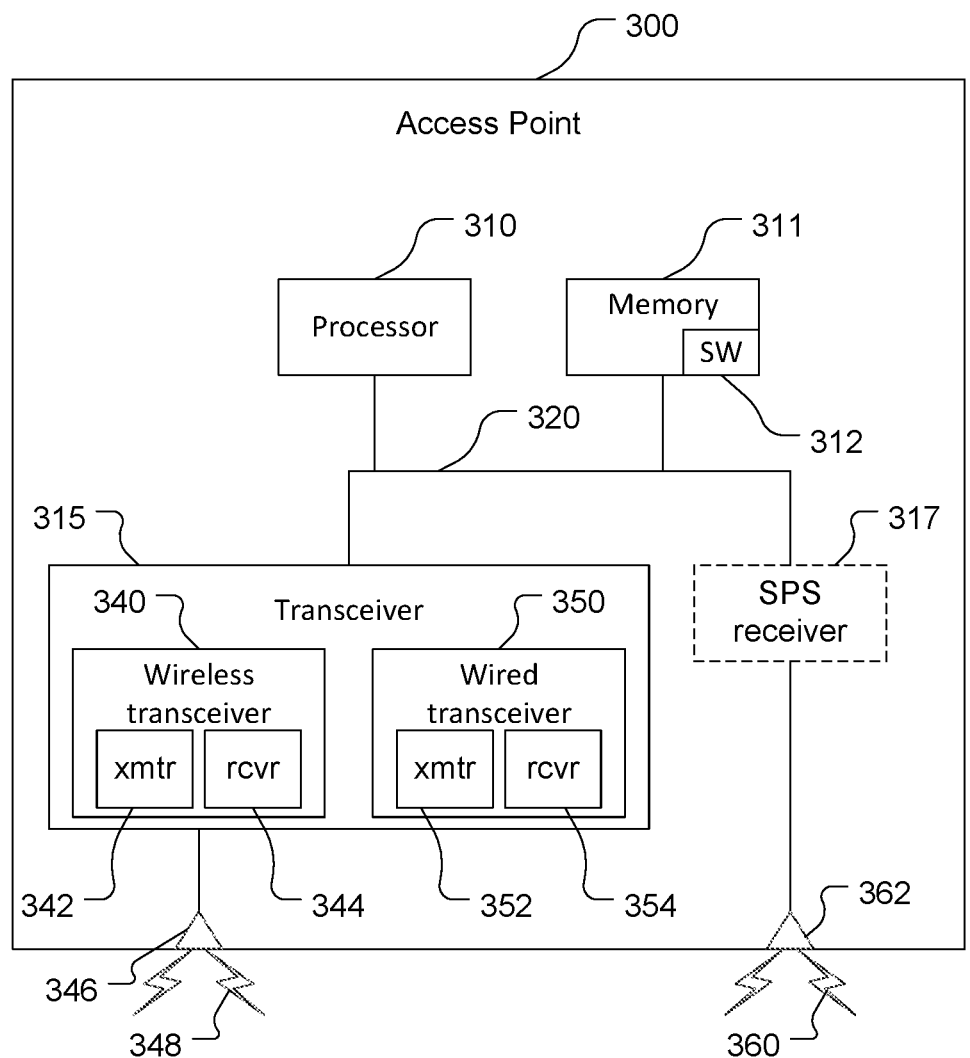
FIG. 3 is a block diagram of components of an example access point.

Referring also to FIG. 3, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.11ax), WiFi, WiFi Direct (WiFi-D), Bluetooth®, Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 4:
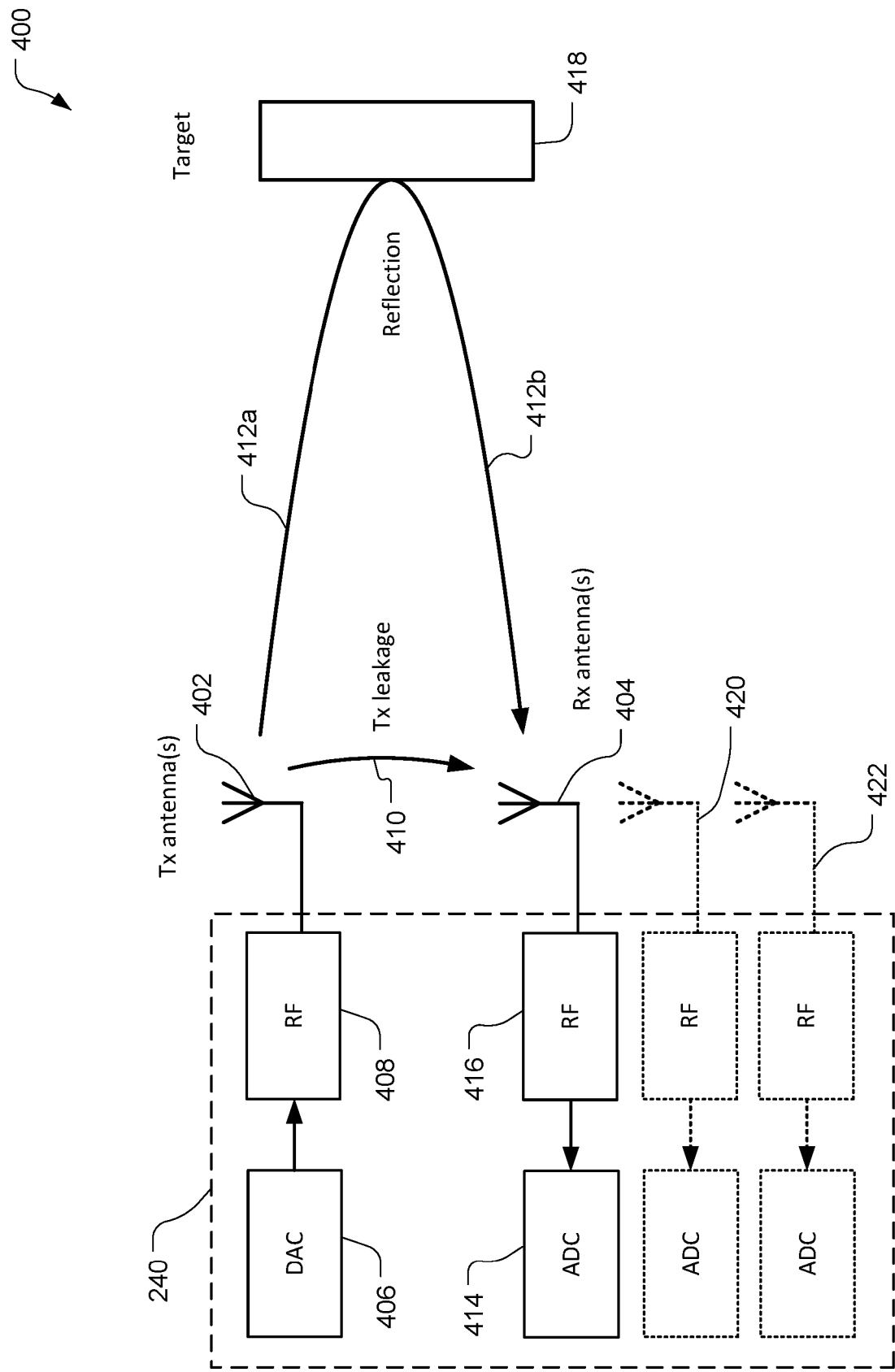
FIG. 4 is a conceptual diagram of radio frequency sensing with concurrent transmission and reception by a wireless device.

Referring to FIG. 4, a conceptual diagram 400 of radio frequency sensing with concurrent transmission and reception by a wireless device is shown. The wireless device, such as the UE 200 or the AP 300, includes a transceiver 240, 340 with a plurality of transmit and receive chains configured for concurrent transmission and reception of RF signals. The number of transmit and receive chains in FIG. 4 are examples only, and not limitations, as other transceiver and antenna configurations may be used. For example, the transceiver 240 may be configured for Multiple Input Multiple Output (MIMO) with two transmit and two receive chains. Other array sizes and configurations may be used. In an example, the transceiver 240 may include a transmit chain including a transmit antenna 402 operably coupled to a transmit RF module 408. The transmit RF module 408 is configured to receive a signal from a Digital-to-Analog Converter (DAC) 406 and transmit a corresponding RF signal via the transmit antenna 402. The signal may be generated by a processor such as the modem processor 232 and/or the application processor 230. The transceiver 240 may include one or more receive chains including a receive antenna 404, a receive RF module 416, and an Analog-to-Digital Converter (ADC) 414. Additional receive modules may also be used, such as a second receive chain 420 and a third receive chain 422.

In operation, the wireless device may transmit a radio frequency signal 412a towards a target 418. A reflected signal 412b is the portion of the RF signal 412a that is reflected by the target 418 and received by the one or more receive antennas, such as the receive antenna 404. The additional receive chains may enable beamforming/direction detection to enable the wireless device to compute an angle of arrival (AoA) for a received signal. The receive chains may also receive a transmission leakage signal 410 concurrently with the transmission of the RF signal 412a. The transmission leakage 410 may be conductive and/or radiated interference depending on the configuration of the wireless device. For example, physical shielding may be used to reduce the radiated interference between the transmit and receive antennas. In an embodiment, the radio frequency signal 412a may be a pre-designed sequence with length 'L'. The pre-designed sequence may be designed to have cyclic autocorrelation properties, such as single carrier Zadoff-Chu sequences, or Orthogonal frequency-division multiplexed (OFDM) like symbols. The sequence may be transmitted repeatedly and continuously for 'n' times, such that the receive chain(s) of the wireless device may start listening at a later time for length 'L' to receive the sequence without missing the signal information. This relaxed time requirement on receive chains means they do not have to start at the same time as the transmitter.

The receive RF module 416 (and the additional receive chains 420, 422) may listen for and receive 'm' number of sequences instead of 1 sequence. For example, the receive RF module 416 may listen for a length of m*L, where 'm' is the number of sequences captured by the receive RF module 416, and m<=n. The UE 200 may combine the received 'm' sequences to improve the signal-to-noise ratio (SNR). The received sequence can be used for RF sensing. For example, a known transmit sequence may be utilized to obtain a channel estimation based on signal correlation techniques. The channel estimation may be processed via an iterative cancellation algorithm to detect leakage and reflection. A time difference between leakage and reflection may be used to estimate a distance to the target 418. Multiple Rx antennas, such as the additional receive chains 420, 422 may be utilized to receive the sequence(s) in the reflected signal 412b, determine the channel estimation, and obtain an angle estimation of the reflected signal 412b. Changes in the channel estimation may be utilized to detect motion of the target 418. Classification algorithms and/or machine learning on the channel estimation results may be used to identify the type of motion and/or size of the target 418. In an example, the channel estimation may be used to detect changes in pose of the target 418.

The number of transmit and receive chains on the wireless device of FIG. 4 is an example only, and not a limitation. Other wireless devices may have multiple arrays, and each array may be comprised of different numbers and patterns of antenna elements. For example, an antenna array may include a matrix of elements in a 1×2, 1×4, 1×5, 1×8, 2×2, 2×4, 2×5, 2×8, 3×4, 3×5, 3×8, etc. Other antenna array matrix dimensions may also be used.

In an embodiment, the wireless device with one or more multielement antenna arrays may be configured to beamform transmitted and receive RF signals. For example, the transceiver 240 may include a radio frequency integrated circuits (RFIC) including with phase shifters to modify the transmit and receive beam gains. The wireless device may be configured to vary the angle of departure (AoD) of the RF signal 412a. In an example, the RF signal 412a may be swept through different AoDs, and the gain of the corresponding reflected signals may be determined. Varying the AoD of the RF signal 412a may be used to determine a direct path to the target 418 (e.g., based on the highest reflected gain). In an example, the beam sweeping may be used to determine changing poses of the object (e.g., based on a series of reflected signals over time). In an embodiment, the transmitted RF signal 412a may be a polarized signal and the polarization of the received signal 412b may be detected. The change in the polarization between the transmitted and received signal may be used to determine characteristics and/or classify the target 418.

Figure 5:
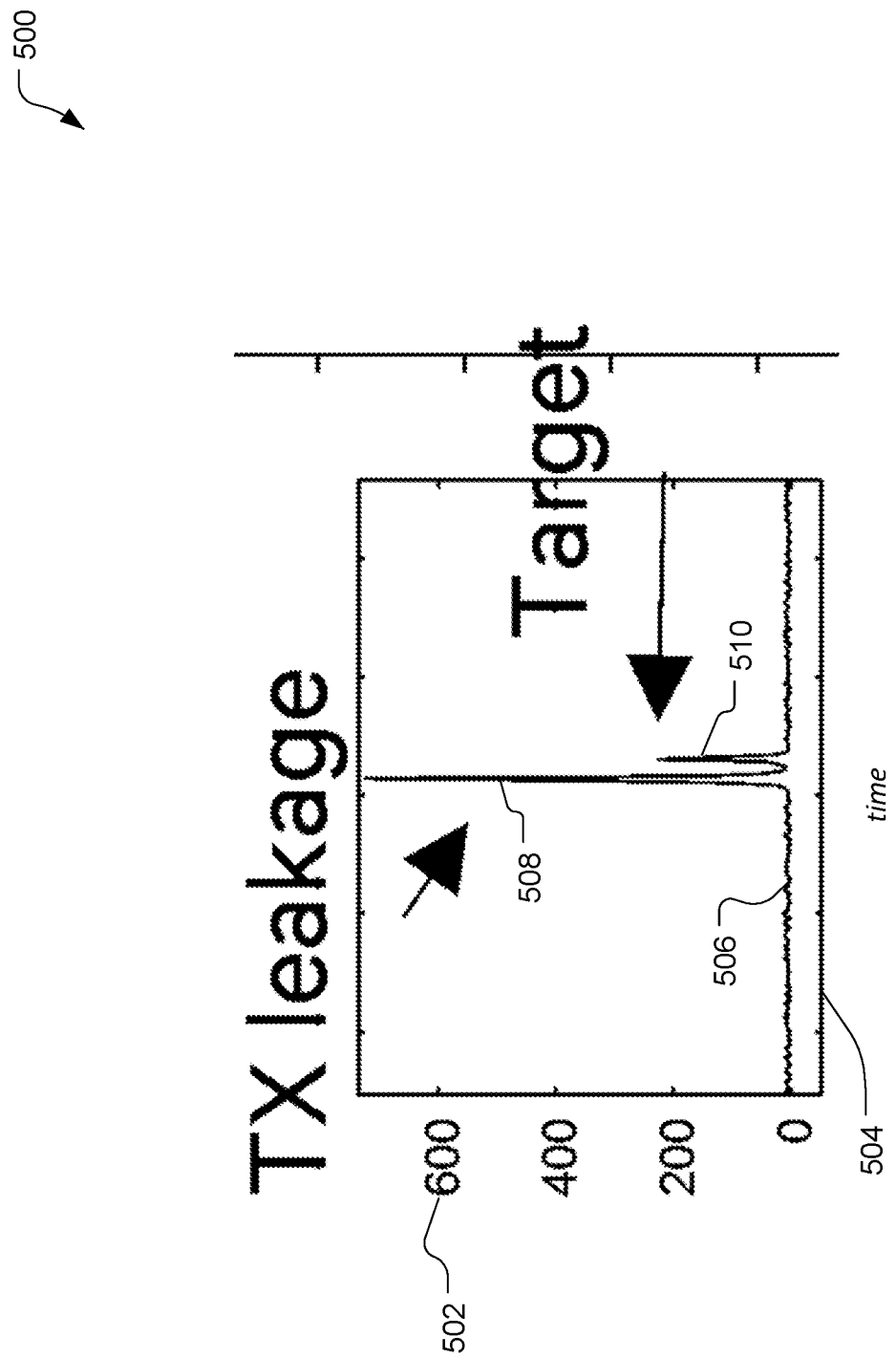
FIG. 5 is a graph of an example receive signal in the wireless device of FIG. 4.

Referring to FIG. 5, with further reference to FIG. 4, a graph 500 of an example receive signal is shown. The graph 500 includes a relative power axis 502, a time axis 504, and a signal response function 506. The signal response function 506 represents the signal detected by the receive antenna 404. A first peak 508 is based on the transmission leakage 410, and a second peak 510 is based on the reflected signal 412b. The RF receiver 416 (and the other receive chains 420, 422) may be configured to reduce the receive gain for the duration of the transmission of the RF signal 412a. For example, one or more amplifier components (e.g., Low Noise Amplifiers (LNAs)) in the receivers may be configured with adjustable gain functionality. The receive gain may be reduced to lessen the impact of the leakage on the receive chains. Other iterative cancellation algorithms may be used to reduce the impact of the first peak 508 and improve the detection of the second peak 510. The transmission gain of the RF transmit module 408 may be increased to improve the detection of the reflected signal 412b. For example, the transmission gain may be increased iteratively for each of the sequences based on the values of the peak or peaks associated with the reflected signal 412b.

In operation, the signal response function 506 includes the transmitted sequences and the corresponding ADC capture in the ADC module 414 is equivalent to channel capture, which may be utilized to enable channel capture based RF sensing use cases. The time difference between the first peak 508 (i.e., the time of transmission) and the second peak 510 (i.e., the reflected signal 412b) may be utilized to estimate the distance to the target 418. The AoA of the reflected signal 412b may be obtained based on the ADC capture from multiple antennas (e.g., additional receive chains 420, 422). The measured distance and direction information to the target 418 may be used in an indoor mapping application. The bandwidth of the transmitted RF signal 412a may vary and is not limited to a Wi-Fi packet bandwidth. For example, wide bandwidths may be based on the DAC and ADC rates and analog filter bandwidths which may be larger than the Wi-Fi packet bandwidth. The transmission and reception of the RF signals 412a may be performed within hundreds of microseconds and thus the impact on Wi-Fi communications may be minimal. Thus, the RF sensing techniques described herein may be used concurrently with Wi-Fi data exchange functionality.

Figure 6:
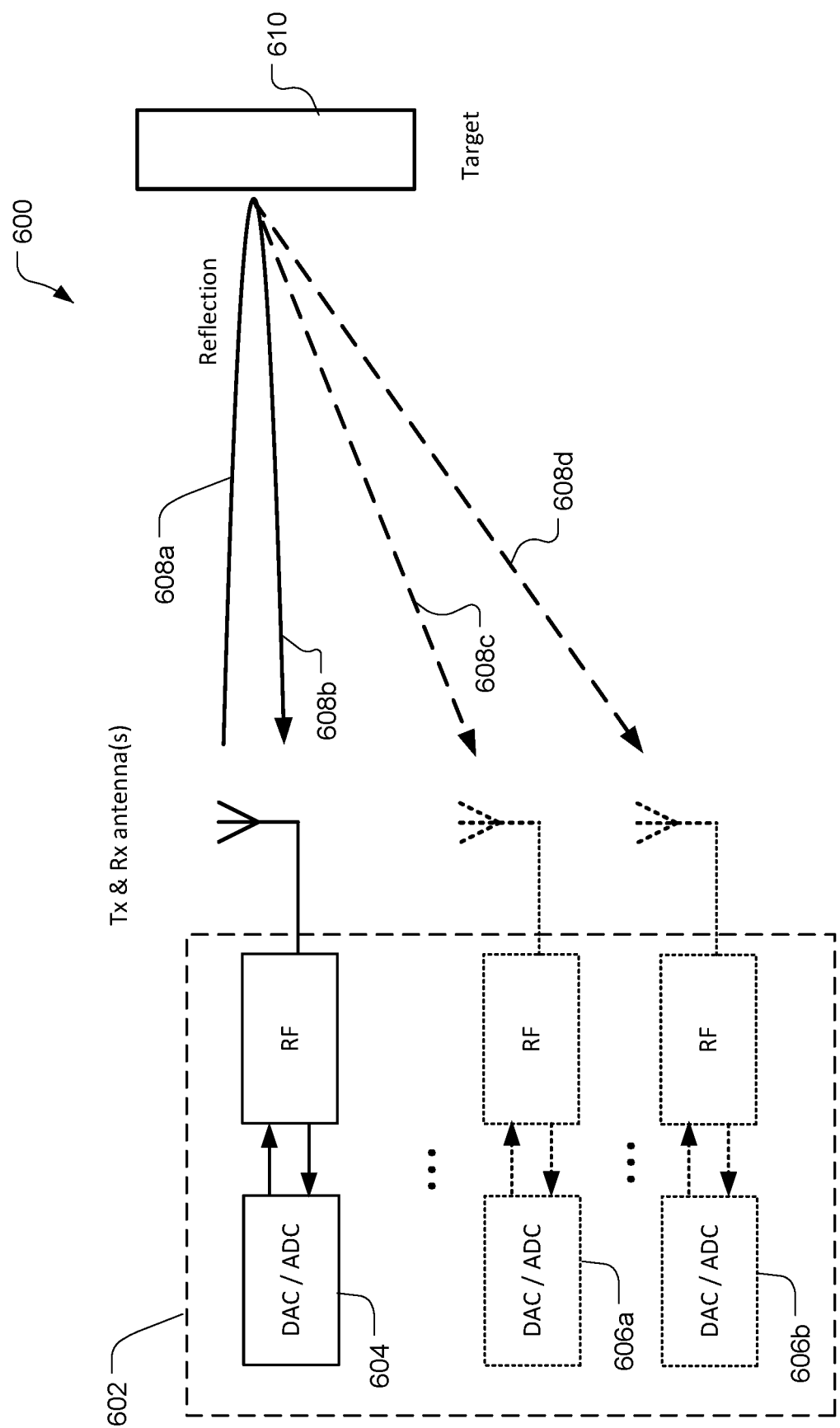
FIG. 6 is a conceptual diagram of intra-chain transmission and reception by a wireless device.

Referring to FIG. 6, a conceptual diagram 600 of an intra-chain transmission and reception by a wireless device is shown. The wireless device, such as the UE 200 or the AP 300, includes a transceiver 602 with one or more transmit and receive chains. The number of transmit and receive chains in FIG. 6 are examples only, and not limitations, as other transceiver and antenna configurations may be used. For example, the transceiver 602 may be configured for multiple ins, multiple outs (MIMO) with two transmit and two receive chains. Other array sizes and configurations may be used. In general, transmit and receive chains are conceptual terms meaning the hardware necessary for transmit/receive signal processing. A MIMO radio may be configured to add signal components from multiple antennas. A single-chain transmit and receive operation may utilize a single antenna for transmit and receive functions. In an example, a first transceiver chain 604 is configured for single-chain Tx and Rx operation. The transceiver 602 may include additional transceiver chains 606a, 606b configured for single-chain or independent Tx and Rx operation. The first transceiver chain 604 is configured to transmit an RF signal 608a towards a target 610 and then receive the reflected RF signal 608b. For example, the first transceiver chain 604 may be configured to switch between ports of a directional coupler to enable intra-chain Tx and Rx operation. In an embodiment, the additional transceiver chains 606a, 606b may also receive respective reflected signals 608c, 608d. The RF signal 608a may be single carrier Zadoff-Chu sequences or orthogonal frequency-division multiplexed symbols (OFDM), or other orthogonal resources, configured to optimize synchronization and channel estimate performance, such as described in FIG. 4. In an example, the wireless device may utilize multiple Tx and multiple Rx using MIMO for improved channel information capturing, such as through the use of existing MIMO preamble Long Training Field (LTF) sequences. Other sequences and signals may also be used.

Figure 7:
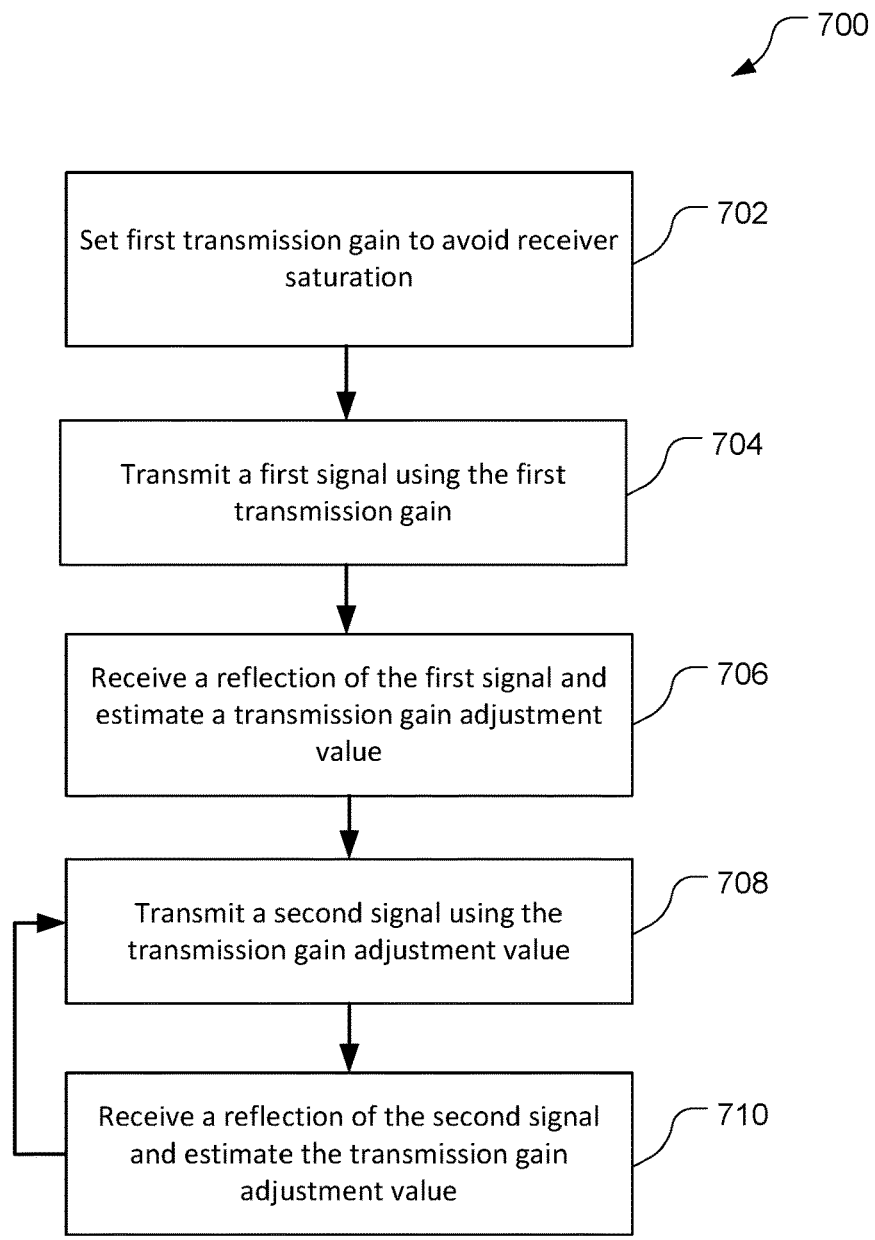
FIG. 7 is an exemplary process flow for a method of setting a transmission gain for radio frequency sensing.

Referring to FIG. 7, with further reference to FIGS. 1-6, a method 700 for setting a transmission gain for radio frequency sensing includes the stages shown. In general, the method 700 may be used for setting the transmission gain of the RF signals to increase the Received Signal Strength Indication (RSSI), while reducing receiver saturation. The method 700 is, however, an example only and not limiting. The method 700 may be altered, e.g., by having stages added, removed, rearranged, combined, performed concurrently, and/or having single stages split into multiple stages.

At stage 702, the method includes setting a first transmission gain to avoid receiver saturation. The transmit RF module 408 is a means for setting the first transmission gain. The transceiver in a wireless device, such as the UE 200 and the AP 300, may be configured to modify the output gain (e.g., adjust the Tx power) of one or more transmitter chains such as the transmit RF module 408. The RF module 408 may transmit a first RF signal with a low transmit gain (e.g., Tx Gain_1) that is safe enough to avoid receiver saturation. The receiver saturation may be determined based on the amount of signal clipping observed in the received signal. The value of Tx Gain_1 may be selected such that the received signal will not be distorted due to clipping or other attenuation due to signal saturation. In an example, the value of Tx Gain_1 may be stored in memory and used for an initial transmission in an RF sensing application.

At stage 704, the method includes transmitting a first signal using the first transmission gain. The transmit RF module 408 is a means for transmitting the first signal using the first transmission gain. For example, referring to FIG. 4, the first signal may be the RF signal 412a. The first signal may be a first Wi-Fi RF sensing packet, or other RF signal such as single carrier Zadoff-Chu sequences, or OFDM LTF-like symbols.

At stage 706, the method includes receiving a reflection of the first signal and estimating a transmission gain adjustment value. The receive RF module 416 is a means for receiving a reflection of the first signal and the processor 230 may be a means for estimating the transmission gain adjustment value. Referring to FIG. 4, the reflected signal may be the reflected signal 412b. In an example, the processor 230, or other processors in the wireless device, may be configured to determine the remaining headroom in the ADC 414 based on the first signal. The headroom may be based on the amplitude of a time varying signal (e.g., sine wave peaks) or the level of clipping in an orthogonal signal (e.g., OFDM like symbols). The increase of the transmission gain may be based on the remaining headroom available. The transmission gain adjustment may be a value Tx Gain_delta, which represents an estimate of the transmission gain increase to improve the RSSI without saturating the receiver.

At stage 708, the method includes transmitting a second signal using the transmission gain adjustment value. The transmit RF module 408 is a means for transmitting the second signal. The transmit RF module 408 may transmit another Wi-Fi RF sensing packet, or other RF signal with a transmitter gain equal to the first transmission gain (i.e., Tx Gain_1) plus the transmission gain adjustment value (i.e., TX Gain_delta). Thus, the signal may have a transmission gain value TX Gain_2=Tx Gain_1+TX Gain_delta.

At stage 710, the method includes receiving a reflection of the second signal and estimating the transmission gain adjustment value. The receive RF module 416 is a means for receiving the second signal and the processor 230 may be a means for estimating the transmission gain adjustment value. In an example, the processor 230, or other processors in the wireless device, may be configured to determine the remaining headroom in the ADC 414 based on the signal transmitted at stage 708 (e.g., at a transmission gain of Tx Gain_2). The processor 230 may be configured to adjust the transmission gain adjustment value based on the amplitude of a time varying signal (e.g., sine wave peaks) or the level of clipping in an orthogonal signal (e.g., OFDM like symbols) as previously described. The transmit gain value may be adjusted and the process may iterate back to stage 708 based on the adjusted transmit gain values on additional signals.

The method 700 may be used to set the transmit gain value when a wireless device is initialized and the Wi-Fi RF sensing capabilities are activated. The method 700 may also be executed periodically or based on trigger conditions such as a change in location, a change in the surrounding environment, or a change in hardware or software is detected. Other trigger conditions, such as abnormal RSSI values or when ADC clipping is detected may also be used to initialize the method 700.

Figure 8:
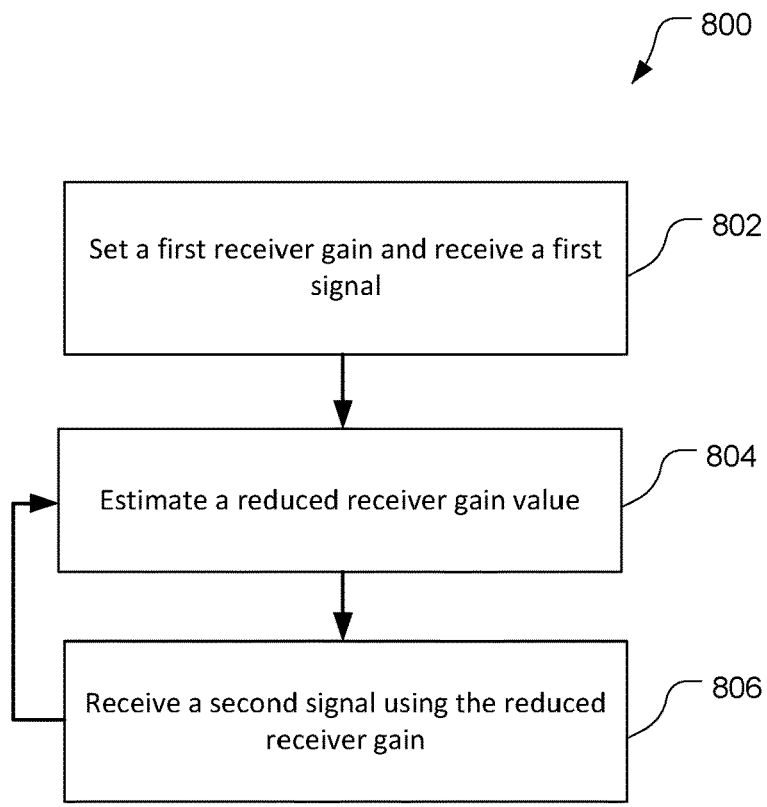
FIG. 8 in an exemplary process flow for a method of setting a receiver gain for radio frequency sensing.

Referring to FIG. 8, with further reference to FIGS. 1-6, a method 800 for setting a receiver gain for radio frequency sensing includes the stages shown. In general, the method 800 may be used for setting the receiver gain of RF signals to improve the ADC range, reduce quantization noise and clipping, and improve weak signal detection. The method 800 is, however, an example only and not limiting. The method 800 may be altered, e.g., by having stages added, removed, rearranged, combined, performed concurrently, and/or having single stages split into multiple stages.

At stage 802, the method includes setting a first receiver gain and receiving a first signal. The receive RF module 416 is a means for setting the first receiver gain and receiving a first signal. The first receiver gain value (i.e., Rx Gain_1) may be a pre-established value stored in a memory and set when the receive RF module 416 is initialized. The first signal may be the reflected signal 412b comprising a first Wi-Fi RF sensing packet, or other RF signal such as single carrier Zadoff-Chu sequences, or OFDM LTF-like symbols.

At stage 804, the method includes estimating a reduced receiver gain value. The processor 230 may be a means for estimating the reduced receiver gain value. In an example, the processor 230, or other processors in the wireless device, may be configured to determine the extent of receive signal clipping that is occurring in the ADC 414. The clipping may be based on an expected amplitude of a time varying signal (e.g., sine wave peaks) or the level of clipping of resources in an orthogonal signal (e.g., OFDM like symbols). The receiver gain may be reduced by a value Rx Gain_delta, which represents a proportional reduction in receiver gain based on the ADC range and the level of clipping in the receive signal. The first receiver gain is reduced by the estimate value (i.e., Rx Gain_2=Rx Gain_1−Rx Gain_delta).

At stage 806, the method includes receiving a second signal using the reduced receiver gain. The receive RF module 416 is a means for receiving a second signal. The second signal may be another reflected signal 412b comprising a second Wi-Fi RF sensing packet, or another RF signal such as previously described. The method 800 may iterate back to stage 804 to determine if the receive gain value requires additional adjustment based on the quality of the signal in the ADC 414. The method 800 may be used to set the receiver gain value when a wireless device is initialized and the Wi-Fi RF sensing capabilities are activated. The method 800 may also be executed periodically or based on trigger conditions such as a change in location, a change in the surrounding environment, or a change in hardware or software is detected. Other trigger conditions, such as abnormal RSSI values or when ADC clipping is detected may also be used to initialize the method 800.

In operation, the wireless device may be configured to clear a channel before transmitting the RF sensing signal to avoid collisions with other Wi-Fi frames. In an example, the device may send a Clear-to-Send (CTS) to itself at the same bandwidth as the RF sensing signal to clear the channel In another example, the device may send an existing Wi-Fi Legacy preamble format to ensure that other devices defer for the RF sensing signal. In another example, the device is configured to send the RF sensing signal within the Short Inter-Frame Spacing (SIFS) after a transmit or after the end of a received packet. Other methods may also be used to verify that the channel is clear.

Figure 9:
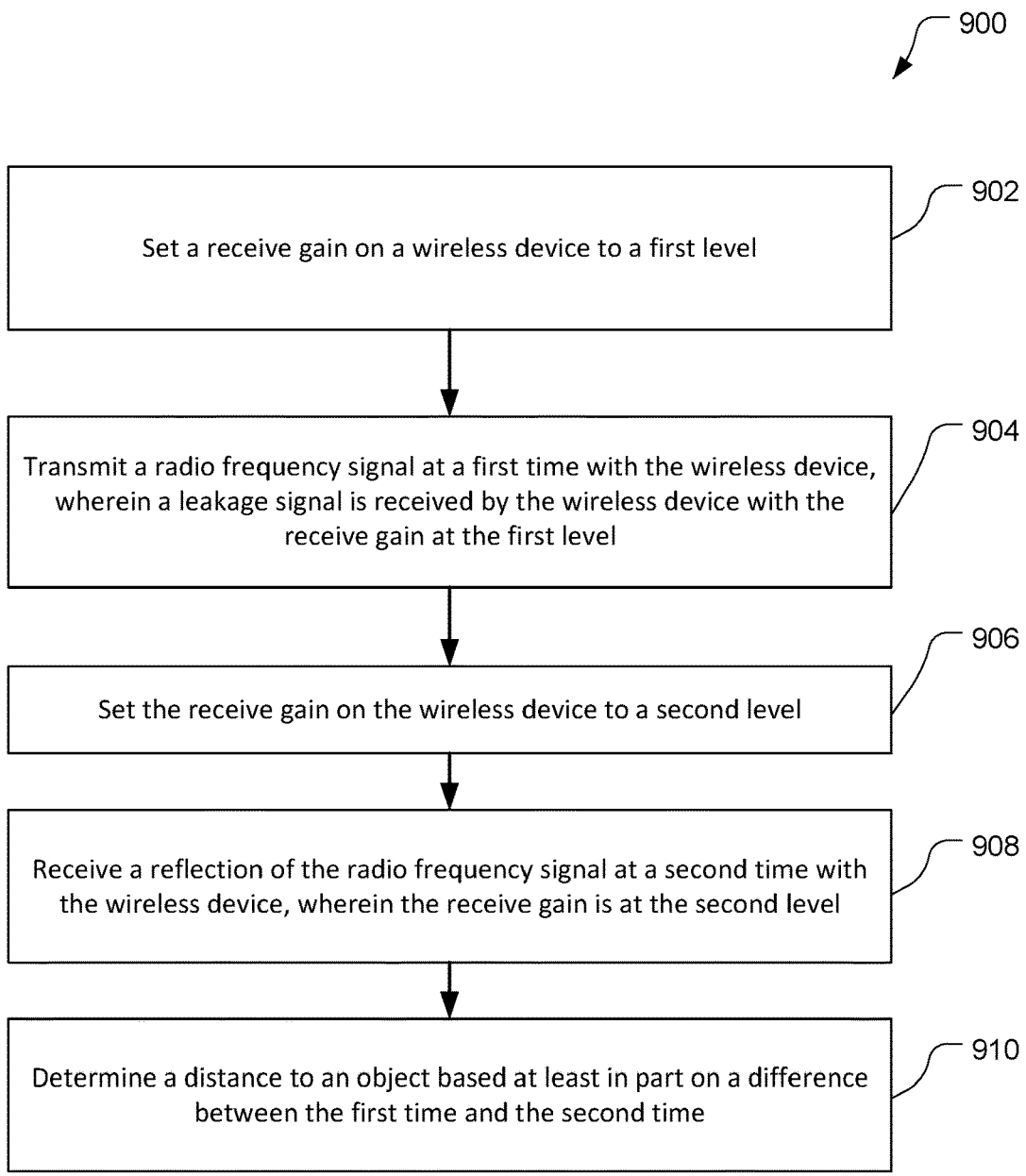
FIG. 9 is an exemplary process flow for a method for controlling a receiver in a wireless device for radio frequency sensing.

Referring to FIG. 9, with further reference to FIGS. 1-8, a method 900 for controlling a receiver in a wireless device for radio frequency sensing includes the stages shown. The method 900 is, however, an example only and not limiting. The method 900 may be altered, e.g., by having stages added, removed, rearranged, combined, performed concurrently, and/or having single stages split into multiple stages.

At stage 902, the method includes setting a receive gain on a wireless device to a first level. The receive RF module 416 is a means for setting a receive gain to a first level. In an example, a wireless device such as the UE 200 or the AP 300 are configured to reduce the gain on one or more receive chains during a period an RF sensing signal is transmitted. For example, the RF receiver 416 (and the other receive chains 420, 422) may be configured to reduce the receive gain for the duration of the transmission of the RF signal 412a. In an embodiment, one or more amplifier components (e.g., LNAs) in the receivers may be configured with adjustable gain functionality, and the receive gain may be reduced to lessen the impact of the leakage on the receive chains.

At stage 904, the method includes transmitting a radio frequency signal at a first time with a wireless device, wherein a leakage signal is received by the wireless device with the receive gain at the first level. A transmit RF module 408 is a means for transmitting the radio frequency signal. Referring to FIG. 4, the leakage signal may be the leakage signal 410 which is received concurrently with the transmission of the RF signal. In an example, the RF signal may be a pre-designed sequence designed to have cyclic auto-correlation properties, such as single carrier Zadoff-Chu sequences, or OFDM LTF-like symbols. The first time may be based on a time one RF signal in a sequence is transmitted. The sequence may be transmitted repeatedly and continuously for 'n' times, such that the receive chain(s) of the UE 200 or AP 300 may start listening at a later time for length 'L' to receive the sequence without missing the signal information. In an embodiment, the method 700 may be used to set the transmitter gain for the RF signal.

At stage 906, the method includes setting the receive gain on the wireless device to a second level. The receive RF module 416 is a means for setting a receive gain to the second level. The second level may be in increase in receiver gain as compared to the first level. That is, the LNA's in the receive gains may be configured to increase sensitivity to detect the reflected signal 412b. The increase in receiver gain occurs after the transmission at stage 904. In an embodiment, the method 800 may be used to set the value for the second receive gain level.

At stage 908, the method includes receiving a reflection of the radio frequency signal at a second time with the wireless device, wherein the receive gain is at the second level. The receive RF module 416 is a means for receiving the reflected radio frequency signal. The reflected radio frequency signal received at the second time may be the reflected RF signal 412b and may be received by one or more receive chains (e.g., the additional receive chains 420, 422). In an example, the receive RF module 416 may listen using the increased Rx gain value for the second peak 510, which is a received at the second time. The receive RF module 416 may also listen and receive 'm' number of sequences instead of 1 sequence. For example, receive RF module 416 may listen for a length of m*L, where 'm' is the number of sequences captured by the receive RF module 416, and m<=n. The wireless device may combine the received 'm' sequences to improve the signal-to-noise ratio (SNR) of the reflected signals.

At stage 910, the method includes determining a distance to an object based at least in part on the difference between the first time and the second time. The processors 230 in the UE 200 and the processor 310 in the AP 300 are means for determining a distance. The difference between the transmit time (i.e., the first time) and the receive time (i.e., the second time) represents the roundtrip time of flight for the transmitted signal 412a and the reflected signal 412b. In an example, the distance may be computed as half the time difference times the speed of light. Other error correction and bias values may also be used in the distance computation. Additional values, such as RSSI and AoA for example, may be used to determine the distance, bearing and orientation of the target.

Figure 10:
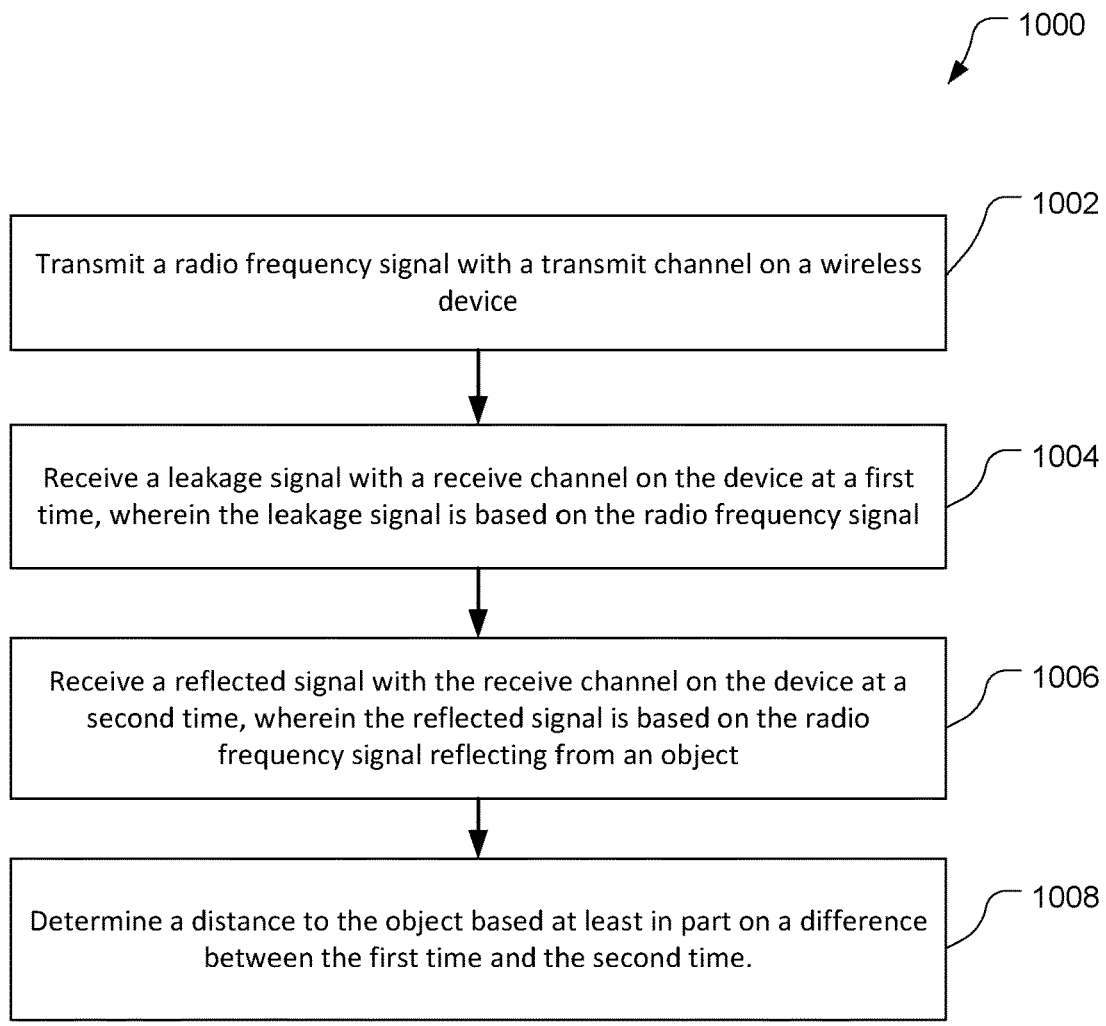
FIG. 10 is an exemplary process flow for a method of determining a distance to an object with radio frequency sensing.

Referring to FIG. 10, with further reference to FIGS. 1-8, a method 1000 for determining a distance to an object with radio frequency sensing includes the stages shown. The method 1000 is, however, an example only and not limiting.

The method 1000 may be altered, e.g., by having stages added, removed, rearranged, combined, performed concurrently, and/or having single stages split into multiple stages.

At stage 1002, the method includes transmitting a radio frequency signal with a transmit channel on a wireless device. A transmit RF module 408 is a means for transmitting the radio frequency signal. The radio frequency signal may be one or more Wi-Fi packets or other RF signal transmitted from one or more transmit antennas 402. In general, a Wi-Fi packet is a term for an electronic transmission of data in a Wi-Fi network. In an embodiment, the wireless device may be configured to transmit a plurality of RF signals from one or more transmitters and transmit antennas. In an example, the RF signal may be a pre-designed sequence designed to have cyclic autocorrelation properties, such as single carrier Zadoff-Chu sequences, or OFDM LTF-like symbols. The first time may be based on a time one RF signal in a sequence is transmitted. The sequence may be transmitted repeatedly and continuously for 'n' times, such that the receive chain(s) of the UE 200 or AP 300 may start listening at a later time for length 'L' to receive the sequence without missing the signal information. In an embodiment, the transmitter gain for the RF signal may be determined based on method 700 and stored in memory for use when an RF sensing application is activated.

At stage 1004, the method includes receiving a leakage signal with a receive channel on the device at a first time, wherein the leakage signal is based on the radio frequency signal. The receive RF module 416 is a means for receiving the leakage signal. In an example, one or more receive chains in the wireless device may receive a transmission leakage signal 410 concurrently with the transmission of the RF signal at stage 1002. The transmission leakage 410 may be conductive and/or radiated interference depending on the configuration of the wireless device. The wireless device is configured to determine a time or times when one or more RF leakage signals are received. The leakage signal may be received on more than one receive chain and the timing of a TX leakage peak (e.g., the first peak 508).

At stage 1006, the method includes receiving a reflected signal with the receive channel on the device at a second time, wherein the reflected signal is based on the radio frequency signal reflecting from an object. The receive RF module 416 is a means for receiving the reflected signal. The radio frequency signal received at the second time may be the reflected RF signal 412b and may be received by one or more receive chains (e.g., the additional receive chains 420, 422). In an example, the receive RF module 416 may listen and receive 'm' number of sequences instead of 1 sequence. For example, receive RF module 416 may listen for a length of m*L, where 'm' is the number of sequences captured by the receive RF module 416, and m<=n. The wireless device may combine the received 'm' sequences to improve the signal-to-noise ratio (SNR) of the reflected signals. In an embodiment, the receiver gain for receiving the RF signal may be determined based on method 800 and stored in memory for use when an RF sensing application is activated.

At stage 1008, the method includes determining a distance to an object based at least in part on the difference between the first time and the second time. The processors 230 in the UE 200 and the processor 310 in the AP 300 are means for determining a distance. The difference between the time the leakage signal is received (i.e., the first time) and the receive time (i.e., the second time) represents the roundtrip time of flight for the transmitted signal 412a and the reflected signal 412b. In an example, the distance may be computed as half the time difference times the speed of light. Other error correction and bias values may also be used in the distance computation. Additional values, such as RSSI and AoA for example, may be used to determine the distance, bearing and orientation of the target.

In an embodiment, the method 1000 may include one or more additional features. For example, the radio frequency signal may be a predesignated sequence. Single carrier Zadoff-Chu sequences, orthogonal frequency-division multiplexed symbols, one or more Wi-Fi packets are examples of predesignated sequences. A plurality of radio frequency signals may be transmitted and received. A plurality of radio frequency signals may be transmitted with a plurality of transmit channels. A radio frequency signal may be received with a plurality of receive chains. Angle of arrivals (AoA) for received RF signals, and angle of departure (AoD) for transmitted signals may be determined. Transmitting and receiving the radio frequency signal may be performed with a single-chain transmit and receive operation.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for determining a distance to an object with radio frequency sensing, comprising:
   transmitting a radio frequency signal with a transmit channel on a wireless device;
   receiving a leakage signal with a receive channel on the wireless device at a first time, wherein the leakage signal is based on the radio frequency signal;
   receiving a reflected signal with the receive channel on the wireless device at a second time, wherein the reflected signal is based on the radio frequency signal reflecting from the object; and
   determining the distance to the object based at least in part on a difference between the first time and the second time.

2. The method of clause 1 wherein the radio frequency signal is a predesignated sequence.

3. The method of clause 2 wherein the predesignated sequence is a single carrier Zadoff-Chu sequence.

4. The method of clause 2 wherein the predesignated sequence includes orthogonal frequency-division multiplexed symbols.

5. The method of clause 2 wherein the predesignated sequence includes one or more Wi-Fi packets.

6. The method of clause 1 further comprising transmitting a plurality of radio frequency signals and receiving one or more of the plurality of radio frequency signals.

7. The method of clause 1 further comprising transmitting a plurality of radio frequency signals with a plurality of transmit channels.

8. The method of clause 1 wherein receiving the radio frequency signal includes receiving the radio frequency signal with a plurality of receive chains.

9. The method of clause 8 further comprising determining an angle of arrival for a received radio frequency signal.

10. The method of clause 1 further comprising determining an angle of departure for the radio frequency signal.

11. The method of clause 1 wherein transmitting the radio frequency signal and receiving the radio frequency signal is performed with a single-chain transmit and receive operation.

12. An apparatus, comprising:
    a memory;
    at least one transceiver comprising at least one transmit chain and at least one receive chain;
    at least one processor communicatively coupled to the memory and the at least one transceiver, and configured to:
    transmit a radio frequency signal with the at least one transmit chain;
    receive a leakage signal with the at least one receive chain at a first time, wherein the leakage signal is based on the radio frequency signal;
    receive a reflected signal with the at least one receive chain at a second time, wherein the reflected signal is based on the radio frequency signal reflecting from an object; and
    determine a distance to the object based at least in part on a difference between the first time and the second time.

13. The apparatus of clause 12 wherein the radio frequency signal is a predesignated sequence.

14. The apparatus of clause 13 wherein the predesignated sequence is a single carrier Zadoff-Chu sequence.

15. The apparatus of clause 13 wherein the predesignated sequence includes orthogonal frequency-division multiplexed symbols.

16. The apparatus of clause 13 wherein the predesignated sequence includes one or more Wi-Fi packets.

17. The apparatus of clause 12 wherein the at least one processor is further configured to transmit a plurality of radio frequency signals and receive one or more of the plurality of radio frequency signals.

18. The apparatus of clause 12 wherein the at least one processor is further configured to transmit a plurality of radio frequency signals with a plurality of transmit chains.

19. The apparatus of clause 12 wherein the at least one processor is further configured to receive the radio frequency signal with a plurality of receive chains.

20. The apparatus of clause 19 wherein the at least one processor is further configured to determine an angle of arrival for a received radio frequency signal.

21. The apparatus of clause 12 wherein the at least one processor is further configured to determine an angle of departure for the radio frequency signal.

22. The apparatus of clause 12 wherein the at least one processor is configure to transmit the radio frequency signal and receive the radio frequency signal with a single-chain transmit and receive operation.

23. An apparatus for determining a distance to an object with radio frequency sensing, comprising:
  means for transmitting a radio frequency signal with a transmit channel on a wireless device;
  means for receiving a leakage signal with a receive channel on the wireless device at a first time, wherein the leakage signal is based on the radio frequency signal;
  means for receiving a reflected signal with the receive channel on the wireless device at a second time, wherein the reflected signal is based on the radio frequency signal reflecting from the object; and
  means for determining the distance to the object based at least in part on a difference between the first time and the second time.

24. The apparatus of clause 23 wherein the radio frequency signal is a predesignated sequence.

25. The apparatus of clause 24 wherein the predesignated sequence is a single carrier Zadoff-Chu sequence.

26. The apparatus of clause 24 wherein the predesignated sequence includes orthogonal frequency-division multiplexed symbols.

27. The apparatus of clause 24 wherein the predesignated sequence includes one or more Wi-Fi packets.

28. The apparatus of clause 23 further comprising means for transmitting a plurality of radio frequency signals and means for receiving one or more of the plurality of radio frequency signals.

29. The apparatus of clause 23 further comprising means for transmitting a plurality of radio frequency signals with a plurality of transmit channels.

30. The apparatus of clause 23 wherein the means for receiving the radio frequency signal includes means for receiving the radio frequency signal with a plurality of receive chains.

31. The apparatus of clause 30 further comprising means for determining an angle of arrival for a received radio frequency signal.

32. The apparatus of clause 23 further comprising means for determining an angle of departure for the radio frequency signal.

33. The apparatus of clause 23 wherein the means for transmitting the radio frequency signal and the means for receiving the radio frequency signal is performed with a single-chain transmit and receive operation.

34. A non-transitory processor-readable storage medium comprising processor-readable instructions to cause one or more processors to determine a distance to an object with radio frequency sensing, comprising:
  code for transmitting a radio frequency signal with a transmit channel on a wireless device;
  code for receiving a leakage signal with a receive channel on the wireless device at a first time, wherein the leakage signal is based on the radio frequency signal;
  code for receiving a reflected signal with the receive channel on the wireless device at a second time, wherein the reflected signal is based on the radio frequency signal reflecting from the object; and
  code for determining the distance to the object based at least in part on a difference between the first time and the second time.

35. The non-transitory processor-readable storage medium of clause 34 wherein the radio frequency signal is a predesignated sequence.

36. The non-transitory processor-readable storage medium of clause 35 wherein the predesignated sequence is a single carrier Zadoff-Chu sequence.

37. The non-transitory processor-readable storage medium of clause 35 wherein the predesignated sequence includes orthogonal frequency-division multiplexed symbols.

38. The non-transitory processor-readable storage medium of clause 35 wherein the predesignated sequence includes one or more Wi-Fi packets.

39. The non-transitory processor-readable storage medium of clause 34 further comprising code for transmitting a plurality of radio frequency signals and code for receiving one or more of the plurality of radio frequency signals.

40. The non-transitory processor-readable storage medium of clause 34 further comprising code for transmitting a plurality of radio frequency signals with a plurality of transmit channels.

41. The non-transitory processor-readable storage medium of clause 34 wherein the code for receiving the radio frequency signal includes code for receiving the radio frequency signal with a plurality of receive chains.

42. The non-transitory processor-readable storage medium of clause 41 further comprising code for determining an angle of arrival for a received radio frequency signal.

43. The non-transitory processor-readable storage medium of clause 34 further comprising code for determining an angle of departure for the radio frequency signal.

44. A method of setting a transmission gain for radio frequency sensing, comprising:
  setting a first transmission gain to avoid receiver saturation;
  transmitting a first signal using the first transmission gain;
  receiving a reflection of the first signal and estimating a transmission gain adjustment value;
  transmitting a second signal using the transmission gain adjustment value; and
  receiving a reflection of the second signal and estimating the transmission gain adjustment value.

45. An apparatus, comprising:
  a memory;
  at least one transceiver comprising at least one transmit chain and at least one receive chain;
  at least one processor communicatively coupled to the memory and the at least one transceiver, and configured to:
  set a first transmission gain to avoid receiver saturation;
  transmit a first signal using the first transmission gain;
  receive a reflection of the first signal and estimate a transmission gain adjustment value;
  transmit a second signal using the transmission gain adjustment value; and
  receive a reflection of the second signal and estimating the transmission gain adjustment value.

46. An apparatus for setting a transmission gain for radio frequency sensing, comprising:
  means for setting a first transmission gain to avoid receiver saturation;
  means for transmitting a first signal using the first transmission gain;
  means for receiving a reflection of the first signal and estimating a transmission gain adjustment value;

means for transmitting a second signal using the transmission gain adjustment value; and
means for receiving a reflection of the second signal and estimating the transmission gain adjustment value.

47. A non-transitory processor-readable storage medium comprising processor-readable instructions to cause one or more processors to set a transmission gain for radio frequency sensing, comprising:
code for setting a first transmission gain to avoid receiver saturation;
code for transmitting a first signal using the first transmission gain;
code for receiving a reflection of the first signal and estimating a transmission gain adjustment value;
code for transmitting a second signal using the transmission gain adjustment value; and
code for receiving a reflection of the second signal and estimating the transmission gain adjustment value.

48. A method for controlling a receiver in a wireless device for radio frequency sensing, comprising:
setting a receive gain on a wireless device to a first level;
transmitting a radio frequency signal at a first time with the wireless device, wherein a leakage signal is received by the wireless device with the receive gain at the first level;
setting the receive gain on the wireless device to a second level;
receiving a reflection of the radio frequency signal at a second time with the wireless device, wherein the receive gain is at the second level; and
determining a distance to an object based at least in part on a difference between the first time and the second time.

49. An apparatus, comprising:
a memory;
at least one transceiver comprising at least one transmit chain and at least one receive chain;
at least one processor communicatively coupled to the memory and the at least one transceiver, and configured to:
set a receive gain on a wireless device to a first level;
transmit a radio frequency signal at a first time with the wireless device, wherein a leakage signal is received by the wireless device with the receive gain at the first level;
set the receive gain on the wireless device to a second level;
receive a reflection of the radio frequency signal at a second time with the wireless device, wherein the receive gain is at the second level; and
determine a distance to an object based at least in part on a difference between the first time and the second time.

50. An apparatus for controlling a receiver in a wireless device for radio frequency sensing, comprising:
means for setting a receive gain on a wireless device to a first level;
means for transmitting a radio frequency signal at a first time with the wireless device, wherein a leakage signal is received by the wireless device with the receive gain at the first level;
means for setting the receive gain on the wireless device to a second level;
means for receiving a reflection of the radio frequency signal at a second time with the wireless device, wherein the receive gain is at the second level; and
means for determining a distance to an object based at least in part on a difference between the first time and the second time.

51. A non-transitory processor-readable storage medium comprising processor-readable instructions to cause one or more processors to control a receiver in a wireless device for radio frequency sensing, comprising:
code for setting a receive gain on a wireless device to a first level;
code for transmitting a radio frequency signal at a first time with the wireless device, wherein a leakage signal is received by the wireless device with the receive gain at the first level;
code for setting the receive gain on the wireless device to a second level;
code for receiving a reflection of the radio frequency signal at a second time with the wireless device, wherein the receive gain is at the second level; and
code for determining a distance to an object based at least in part on a difference between the first time and the second time.

The invention claimed is:

1. A method for determining a distance to an object with radio frequency sensing, comprising:
setting a receive gain of a receive channel on a wireless device to a first receive gain level;
setting a transmitter gain of a transmit channel on the wireless device to a first transmit gain level;
transmitting an at least one radio frequency (RF) signal a first number of times with a transmit channel on the wireless device, having a first antenna, wherein the at least one RF signal includes a sequence having a sequence length;
receiving a leakage signal with the receive channel, having a second antenna, at a first time, wherein the leakage signal is based on the at least one RF signal and the receive gain is set to the first receive gain level;
setting the receive gain of the receive channel to a second receive gain level, wherein the second receive gain level is greater than the first receive gain level;
receiving an at least one reflected signal with the receive channel at a second time, wherein
the at least one reflected signal is based on the at least one RF signal reflecting from an object and the receive gain is set to the second receive gain level,
setting the receive gain to the second receive gain level enables the receive channel to detect the at least one reflected signal, and
the second time is equal to at least the first time plus a transmission duration of a transmission of the sequence length of the sequence of the at least one RF signal;
determining the distance to the object based at least in part on a difference between the first time and the second time;
determining a transmitter gain increase from the at least one reflected signal; and
setting the transmitter gain of the transmit channel to a second transmit gain level;
wherein the second transmit gain level of the transmitter gain is equal to at least the first transmit gain level of the transmitter gain plus the transmitter gain increase.

2. The method of claim 1, wherein the sequence is a predesignated sequence.

3. The method of claim 2, wherein the predesignated sequence is a single carrier Zadoff-Chu sequence.

4. The method of claim 2, wherein the predesignated sequence includes orthogonal frequency-division multiplexed symbols.

5. The method of claim 2, wherein the predesignated sequence includes one or more Wi-Fi packets.

6. The method of claim 1, further comprising transmitting a plurality of RF signals with a plurality of transmit channels.

7. The method of claim 1, wherein receiving the at least one reflected signal includes receiving the at least one reflected signal with a plurality of receive chains.

8. The method of claim 7, further comprising determining an angle of arrival for the at least one reflected signal.

9. The method of claim 1, further comprising determining an angle of departure for the at least one RF signal.

10. The method of claim 1, wherein transmitting the at least one RF signal and receiving the at least one reflected signal is performed with a single-chain transmit and receive operation.

11. An apparatus, comprising:
a memory;
at least one transceiver comprising at least one transmit chain and at least one receive chain;
at least one processor communicatively coupled to the memory and the at least one transceiver, and configured to:
set a receive gain of the at least one receive chain to a first receive gain level;
set a transmitter gain of a transmit channel on the wireless device to a first transmit gain level;
transmit an at least one radio frequency (RF) signal a first number of times with the at least one transmit chain, having a first antenna, wherein the at least one RF signal includes a sequence having a sequence length;
receive a leakage signal with the at least one receive chain, having a second antenna, at a first time, wherein the leakage signal is based on the at least one RF signal and the receive gain is set to the first receive gain level;
set the receive gain of the at least one receive chain to a second receive gain level, wherein the second receive gain level is greater than the first receive gain level;
receive an at least one reflected signal with the at least one receive chain at a second time, wherein
the at least one reflected signal is based on the at least one RF signal reflecting from an object and the receive gain is set to the second receive gain level,
the receive gain being set to the second receive gain level enables the receive channel to detect the at least one reflected signal, and
the second time is equal to at least the first time plus a transmission duration of a transmission of the sequence length of the sequence of the at least one RF signal;
determine a distance to the object based at least in part on a difference between the first time and the second time;
determine a transmitter gain increase from the at least one reflected signal, and
set the transmitter gain of the transmit channel to a second transmit gain level;
wherein the second transmit gain level of the transmitter gain is equal to at least the first transmit gain level of the transmitter gain plus the transmitter gain increase.

12. The apparatus of claim 11, wherein the sequence is a predesignated sequence.

13. The apparatus of claim 12, wherein the predesignated sequence is a single carrier Zadoff-Chu sequence.

14. The apparatus of claim 12, wherein the predesignated sequence includes orthogonal frequency-division multiplexed symbols.

15. The apparatus of claim 12, wherein the predesignated sequence includes one or more Wi-Fi packets.

16. The apparatus of claim 11, wherein the at least one processor is further configured to transmit a plurality of RF signals with a plurality of transmit chains.

17. The apparatus of claim 11, wherein the at least one processor is further configured to receive the at least one reflected signal with a plurality of receive chains.

18. The apparatus of claim 17, wherein the at least one processor is further configured to determine an angle of arrival for the at least one reflected signal.

19. The apparatus of claim 11, wherein the at least one processor is further configured to determine an angle of departure for the at least one RF signal.

20. The apparatus of claim 11, wherein the at least one processor is configure to transmit the at least one RF signal and receive the at least one reflected signal with a single-chain transmit and receive operation.

21. An apparatus for determining a distance to an object with radio frequency sensing, comprising:
means for setting a receive gain of a receive channel on a wireless device to a first receive gain level;
means for setting a transmitter gain of a transmit channel on the wireless device to a transmit gain first level;
means for transmitting an at least one radio frequency (RF) signal a first number of times with a transmit channel on the wireless device, having a first antenna, wherein the at least one RF signal includes a sequence having a sequence length;
means for receiving a leakage signal with the receive channel, having a second antenna, at a first time, wherein the leakage signal is based on the at least one RF signal and the receive gain is set to the first receive gain level;
means for setting the receive gain of the receive channel to a second receive gain level, wherein the second receive gain level is greater than the first receive gain level;
receiving an at least one reflected signal with the receive channel at a second time, wherein
the at least one reflected signal is based on the at least one RF signal reflecting from an object and the receive gain of the receive channel is set to the second receive gain level,
the receive gain being set to the second receive gain level enables the receive channel to detect the at least one reflected signal;
the second time is equal to at least the first time plus a transmission duration of a transmission of the sequence length of the sequence of the at least one RF signal;
means for determining the distance to the object based at least in part on a difference between the first time and the second time;
means for determining a transmitter gain increase from the at least one reflected signal, and
means for setting the transmitter gain of the transmit channel to a second transmit gain level;

wherein the second transmit gain level of the transmitter gain is equal to at least the first transmit gain level of the transmitter gain plus the transmitter gain increase.

22. The apparatus of claim 21, wherein the sequence is a predesignated sequence.

23. The apparatus of claim 22, wherein the predesignated sequence is a single carrier Zadoff-Chu sequence.

24. The apparatus of claim 22, wherein the predesignated sequence includes orthogonal frequency-division multiplexed symbols.

25. The apparatus of claim 22, wherein the predesignated sequence includes one or more Wi-Fi packets.

26. The apparatus of claim 21, further comprising means for transmitting a plurality of RF signals with a plurality of transmit channels.

27. The apparatus of claim 21, wherein the means for receiving the at least one reflected signal includes means for receiving the at least one reflected signal with a plurality of receive chains.

28. The apparatus of claim 27, further comprising means for determining an angle of arrival for the at least one reflected signal.

29. The apparatus of claim 21, further comprising means for determining an angle of departure for the at least one RF signal.

30. The apparatus of claim 21, wherein the means for transmitting the at least one RF signal and the means for receiving the at least one reflected signal is performed with a single-chain transmit and receive operation.

31. A non-transitory processor-readable storage medium comprising processor-readable instructions to cause one or more processors to determine a distance to an object with radio frequency sensing, comprising:
  code for setting a receive gain of a receive channel on a wireless device to a first receive gain level;
  code for setting a transmitter gain of a transmit channel on the wireless device to a first transmit gain level;
  code for transmitting an at least one radio frequency (RF) signal a first number of times with a transmit channel on the wireless device, having a first antenna, wherein the at least one RF signal includes a sequence having a sequence length;
  code for receiving a leakage signal with the receive channel, having a second antenna, at a first time, wherein the leakage signal is based on the at least one RF signal and the receive gain of the receive channel is set to the first receive gain level;
  code for setting the receive gain of the receive channel to a second receive gain level, wherein the second receive gain level is greater than the first receive gain level;
  code for receiving an at least one reflected signal with the receive channel at a second time, wherein
    the at least one reflected signal is based on the at least one RF signal reflecting from the object and the receive gain of the receive channel is set to the second receive gain level,
    the receive gain being set to second receive gain level enables the receive channel to detect the at least one reflected signal, and
    the second time is equal to at least the first time plus a transmission duration of a transmission of the sequence length of the sequence of the at least one RF signal;
  code for determining the distance to the object based at least in part on a difference between the first time and the second time;
  code for determining a transmitter gain increase from the at least one reflected signal, and
  code for setting the transmitter gain of the transmit channel to a second transmit gain level;
  wherein the second transmit gain level of the transmitter gain is equal to at least the first transmit gain level of the transmitter gain plus the transmitter gain increase.

32. The non-transitory processor-readable storage medium of claim 31, wherein the sequence is a predesignated sequence.

33. The non-transitory processor-readable storage medium of claim 32, wherein the predesignated sequence is a single carrier Zadoff-Chu sequence.

34. The non-transitory processor-readable storage medium of claim 32, wherein the predesignated sequence includes orthogonal frequency-division multiplexed symbols.

35. The non-transitory processor-readable storage medium of claim 32, wherein the predesignated sequence includes one or more Wi-Fi packets.

36. The non-transitory processor-readable storage medium of claim 31, further comprising code for transmitting a plurality of RF signals with a plurality of transmit channels.

37. The non-transitory processor-readable storage medium of claim 31, wherein the code for receiving the at least one reflected signal includes code for receiving the at least one reflected signal with a plurality of receive chains.

38. The non-transitory processor-readable storage medium of claim 37, further comprising code for determining an angle of arrival for the at least one reflected signal.

39. The non-transitory processor-readable storage medium of claim 31, further comprising code for determining an angle of departure for the-at least one RF signal.

* * * * *